United States Patent [19]

Jacques

[11] 4,130,786

[45] Dec. 19, 1978

[54] APPARATUS FOR GENERATING LINEAR AND CONTINUOUS POSITIONAL ERROR AND VELOCITY SIGNALS FOR HIGHER ORDER SERVO SYSTEMS

[75] Inventor: James O. Jacques, Tracy, Calif.

[73] Assignee: Xerox Corporation, Stamford, Conn.

[21] Appl. No.: 742,727

[22] Filed: Nov. 17, 1976

[51] Int. Cl.² ............................................. G05B 13/00
[52] U.S. Cl. ................................... 318/561; 318/608; 318/616; 307/261
[58] Field of Search ................ 307/261, 262; 318/617, 318/616, 608, 561

[56] References Cited

U.S. PATENT DOCUMENTS

| | | | |
|---|---|---|---|
| 3,475,626 | 10/1969 | Holzman et al. | 307/262 |
| 3,699,555 | 10/1972 | DuVall | 318/617 |
| 4,059,086 | 9/1977 | Cosksedge | 318/608 |
| 4,059,789 | 11/1977 | Cocksedge | 318/608 |

Primary Examiner—B. Dobeck

Attorney, Agent, or Firm—Barry Paul Smith

[57] ABSTRACT

A higher order servo system including a phase transducer which produces two triangular waveforms, phase displaced 90° in relation to each other, representing the positions of a movable member, and a commutating circuit, responsive to the triangular waveforms, for generating a sawtooth waveform and a velocity signal which is linear and continuous over the whole range of movement of the member. A counter and converter, responsive to pulses also generated by the commutating circuit, generates a staircase waveform, representing predetermined positions of the member, which is added to the sawtooth waveform to produce a positional error signal which is linear and continuous over the whole range of movement of the member. Optimal velocity and acceleration signals are derived from these two linear and continuous signals to drive the member to a desired position over the shortest path, in the minimal amount of time, and with no oscillatory motion at the desired position.

24 Claims, 15 Drawing Figures

FIG_2

FIG_3I  FIG_3J  FIG_3K  FIG_3L

APPARATUS FOR GENERATING LINEAR AND CONTINUOUS POSITIONAL ERROR AND VELOCITY SIGNALS FOR HIGHER ORDER SERVO SYSTEMS

BACKGROUND OF THE INVENTION

The present invention relates to a positional control system and to apparatus for providing control signals giving the positional control system an improved response characteristic.

Conventional positional control systems are comprised of a servo arrangement for driving a load to selected positions, control circuitry for operating the driving arrangement to move the load, and signalling circuitry for generating error signals to which the control circuitry is responsive to actuate the driving arrangement. A theoretically perfect positional control system would (1) drive the load along the shortest path to a selected position, (2) drive the load to the selected position in the shortest possible time, and (3) stop the load at the selected position with no oscillatory motion. Stated another way, the ideal response to such control systems is one in which the positional error is reduced exactly to zero with no overshoot and in the minimum time compatible with the capabilities of the available components of the system.

Conventional second order positional control systems have been implemented in an attempt to realize a theoretically perfect control system. In such second order systems, positional error signals are generated using a position transducer and are indicative of a difference between the position of the load and the selected position. A function generator is responsive to these error signals and generates signals representing the optimal velocity that the load should have at various positions as it moves towards the selected position. A rate signal generator or transducer is also employed to generate signals corresponding to the velocity of the load at the various positions, and these velocity signals are subtracted from the optimal velocity signals to generate velocity error signals which drive the driving arrangement. The driving arrangement then increases or decreases the speed of the load to meet the three requirements mentioned above. One type of such positional control system is known as a "bang-bang" controller in which the driving arrangement is operated at maximum acceleration until the midpoint between the initial and selected positions is reached and at maximum deceleration from the midpoint to the selected position.

There are positional control systems moving a load to a selected position which are known as third order systems. That is, these systems include relay servos having driving motor-load units with a third-order differential equation. These systems employ the same concept of optimum performance as the second order systems, i.e., they attempt to move a load over the shortest distance in the minimum amount of time to position the load at the selected position without any oscillatory motion. The relay servo should operate so that at the selected position, the positional error, the velocity error and the acceleration error are zero. Such third order systems have a driving arrangement which is responsive in part to acceleration signals representing the acceleration of the load at each position on its movement towards the selected position. The acceleration signals used by the third order positional control systems are obtainable from positional error and velocity signals mentioned above in connection with second order systems.

In order for such second order or third order systems to operate optimally, in fact for any system of a higher or lower order, it is desirable that the signals which drive the driving arrangements of each system be derived from positional error and velocity signals which are free from nonlinearities and discontinuities. It is also desirable to generate such positional error and velocity signals which are free of nonlinearities and discontinuities from a single transducer; however, until now this has been a problem.

SUMMARY OF THE INVENTION

It is an object of the present invention to provide a novel apparatus for obtaining linear and continuous signals.

It is another object of the present invention to provide a novel positional control system having improved response characteristics.

A still further object of the present invention is to derive continuous and linear positional error signals and velocity signals from a single transducer in a positional control system.

These and other objects of the present invention are obtained by making use of a single transducer generating two signals of the same triangular waveform but phase displaced with respect to each other and representing the positions of a load as it is moved to a selected position. A commutating circuit means is responsive to these two signals to generate a sawtooth waveform, and a signal, representing the velocity of the load, which is linear and continuous over the full range of movement of the load. Another, staircase waveform is generated in response to the phase displaced signals and provides information as to when the load arrives at predetermined positions on its travel towards the selected position. This staircase waveform is added to the sawtooth waveform to provide a signal which is linear and continuous over the full range of movement of the load and which represents the positions of the load. Means are provided to generate velocity error signals from the positional signal and the velocity signal, these velocity error signals being differentiated to provide acceleration signals which drive a servo to move the load.

BRIEF DESCRIPTION OF THE DRAWINGS

FIGS. 3A–3L are waveforms of various signals present in the circuit of FIGS. 1 and 2.

Figures 1, 4:
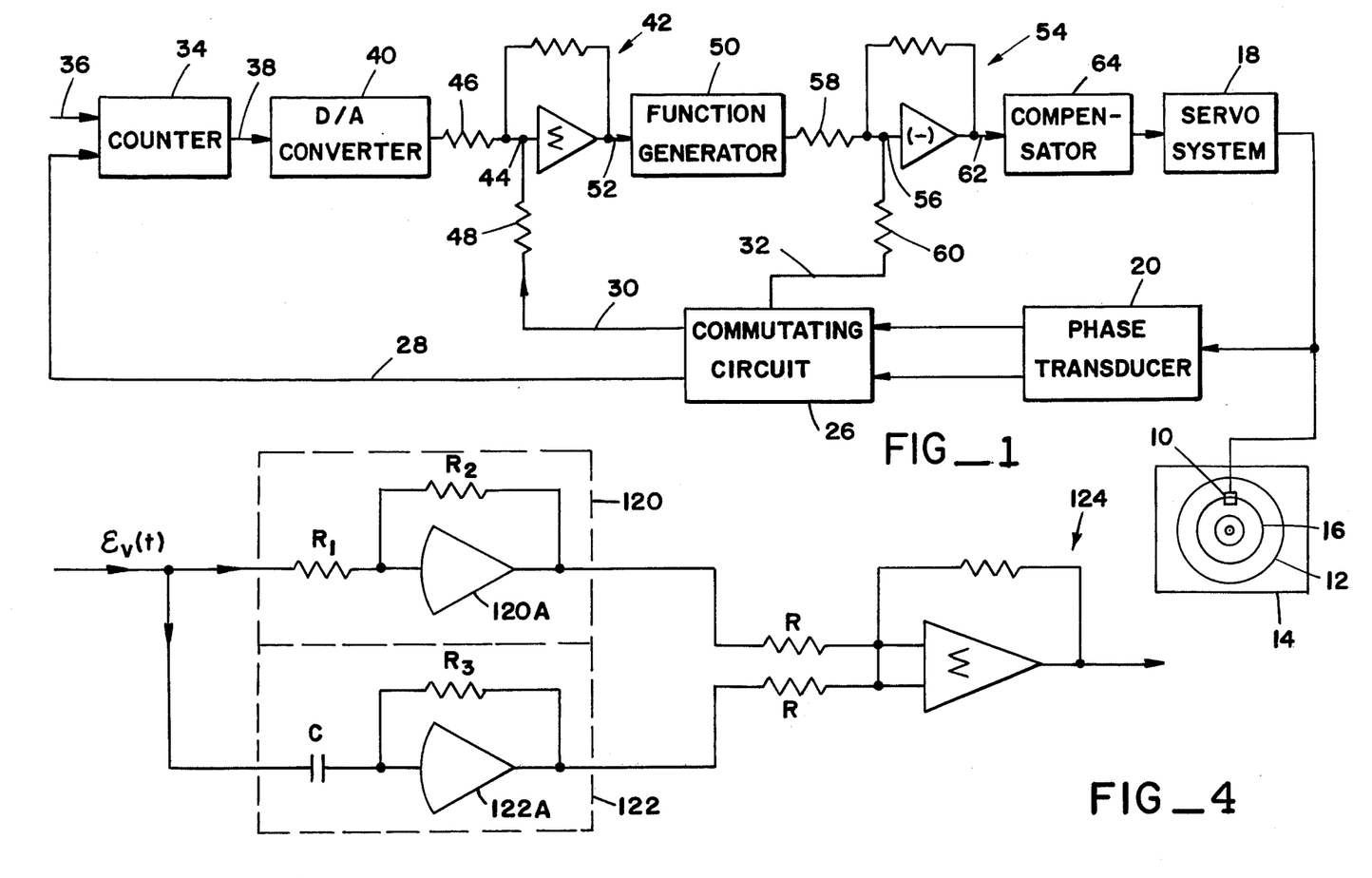
FIG. 1 is a general block diagram of a positional servo control system employing the present invention.
FIG. 4 is a schematic illustration of the compensator of FIG. 1.

While the present invention will be discussed in relation to one particular assembly, i.e., disk drives, it may be used in any assembly requiring the movement of a movable element to a desired position. Typically, in such disk drives, and as shown in FIG. 1, the movable element is a recording head 10 movable radially across a disk 12 rotatable by a motor (not shown) in a clockwise direction. The disk 12 may comprise one of a plurality of disks in a disk pack 14, with each surface of each disk associated with its own recording head 10. The disk 12 has on a surface a plurality of concentric and closely spaced tracks 16, each track storing data in, for example, magnetized form.

This type of data format is normally employed in random access systems in which it is necessary to access randomly and quickly the data on a given track 16. As the disk 12 is rotated, the recording head 10 is radially moved across the tracks 16 from a track over which it is initially positioned to a selected track having the data desired to be reproduced. The recording head 10 is movable radially across the disk 12 by a servo system 18 which is responsive to error signals indicating if the head has been moved to the desired track 16. The servo system 18 may be of any suitable type comprising a power amplifier (not shown), receiving the error signals, for driving a motor (not shown) which moves a carriage (not shown) supporting the recording head 10. For the purposes of describing the present invention, the servo system 18 is a third order system described generally in the textbook "Analysis and Design of Non-Linear Feedback Control Systems", by Thaler and Paster, McGraw-Hill, 1962, Chapter 7, Sections 7-5.

Figure 3B:
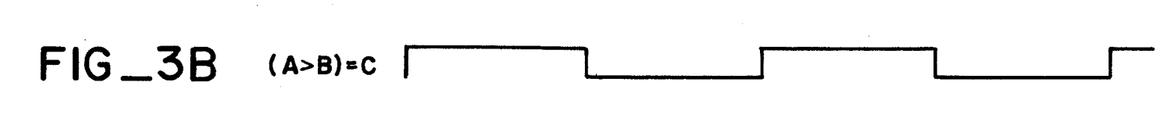

As the servo system 18 drives the recording head 10 across the tracks 16, a phase transducer 20 detects the positions of the carriage and hence the head 10, and produces two output signals on lines 22 and 24, respectively. These output signals are, as shown in FIG. 3A, triangular waveforms A and B, respectively, which have the same shape and are of equal amplitude, but are phase displaced in relation to one another by 90°. In this FIG. 3A, each zero crossing (i.e., 0 volts) of the waveforms A and B, whether it is a positive going or negative going zero crossing, represents that the head 10 is centered over the centerline of a different track. One example of a phase transducer 20 is disclosed in U.S. patent application Ser. No. 670,463, filed Mar. 25, 1976, by Kenneth Cocksedge, entitled "Phase-Sensitive Transducer Apparatus With Signal Offset Means", and assigned to the assignee of the present invention; this application is incorporated by reference herein in its entirety. It is to be noted, however, that any device producing the same triangular waveforms phase displaced in relation to each other by 90° and having equal amplitudes can be used in place of transducer 20.

Figure 3C:
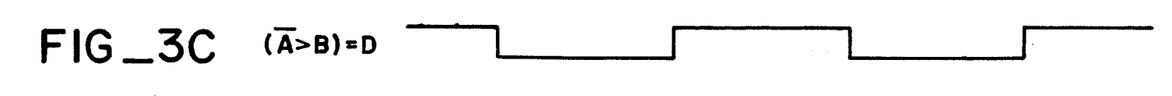
Figure 3D:
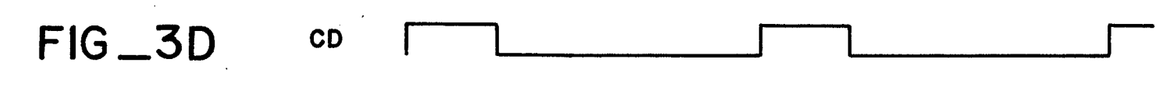
Figure 3E:
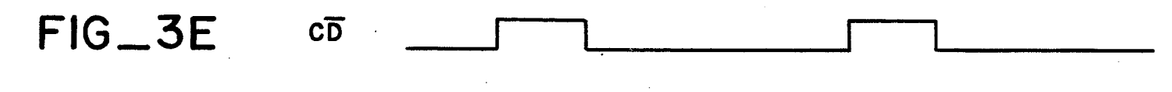
Figure 3F:
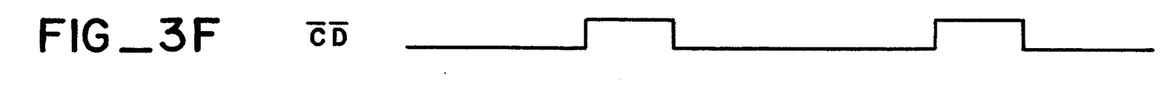
Figure 3G:
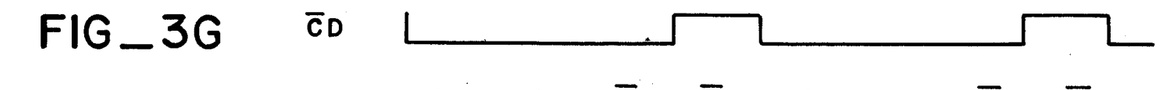
Figure 3H:
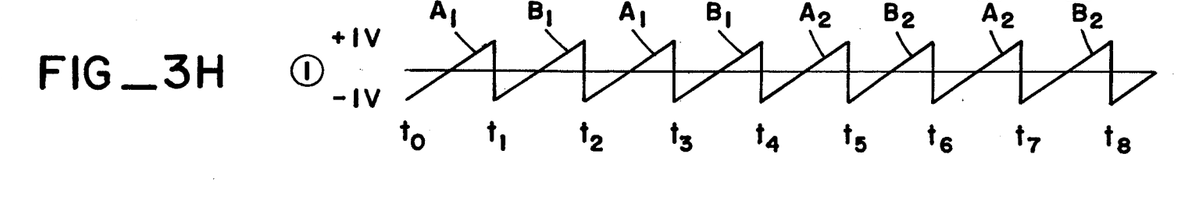

A commutating circuit 26 receives the signals on lines 22,24 and changes them into counter pulses on line 28, a sawtooth waveform on line 30, and a continuous, linear signal on line 32. Each counter pulse on line 28 corresponds to the time head 10 is midway between the centerlines of two adjacent racks, i.e., head 10 is beginning to traverse a new track. The sawtooth waveform on line 30 is shown in FIG. 3H and referenced as #1, while the output signal on line 32 is shown in FIG. 3L and referenced as #2.

Prior to movement of the head from one track 16 to a desired track 16, a counter 34 is adjusted to store a count representing the difference in number of tracks between the track over which the head 10 is initially positioned and the desired track. For example, if the head 10 is over track #6, and it is desired to move it to track #10, then the counter receives a signal on line 36, generated in a known manner, setting the counter to 4. As the counter 34 receives each pulse on line 28, the count is decremented by one until 4 such pulses are received, thereby indicating that the head has arrived over track #10.

Figure 3I:
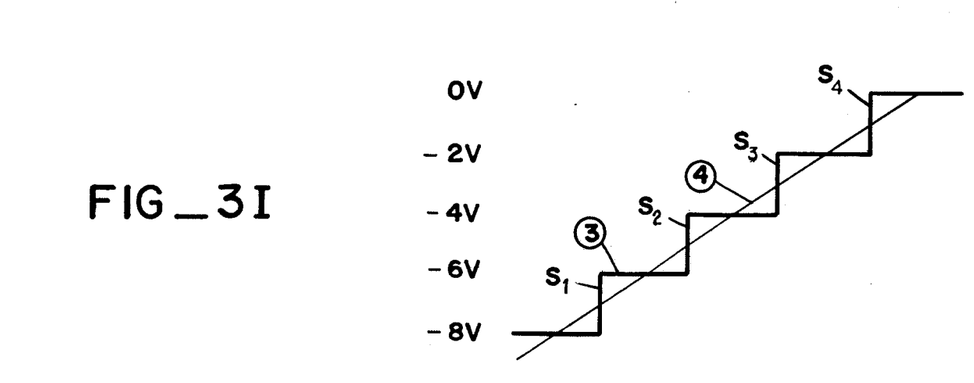

The outputs of counter 34 are fed over line 38 to a digital-to-analog converter 40 which converts the outputs into a staircase waveform shown in FIG. 3I and referenced as waveform #3. As can be appreciated from FIG. 3I, as the count in counter 34 is being decremented, the staircase waveform #3 goes less negative, until there is a count of 0 at which time the output of converter 40 will be 0 volts and the head 10 will be over the desired track. A summer, generally indicated by reference 42, receives at a junction 44 the staircase waveform #3 of FIG. 3I through a resistor 46 and the sawtooth waveform #1 of FIG. 3H through a resistor 48. The summer 42 sums the sawtooth waveform #1 and the staircase waveform #3 to produce a linear, continuous waveform #4, as shown in FIG. 3I, which represents the positional error of the head 10 in relation to the desired track.

A function generator 50 functions to derive optimum velocity signals from the linear positional error signal #4 received from the summer 42 over line 52. The output of the function generator 50 is a voltage signal having various amplitude levels chosen in accordance with the overall characteristics of the servo system 18 to optimize, i.e., reduce, the travel time of the head 10 to the desired track. Typically, the function generator 50 will produce variable voltage levels, representing the optimal velocity that the head should have over a range of positions indicated by the linear, positional waveform #4 shown in FIG. 3I. Function generators are well known, and a teaching of the required elements of the generator which are responsive to the positional error signal #4 for producing optimal driving control signals in a third order system is given in the above-mentioned textbook by Thaler and Paster.

A subtractor shown generally as reference 54 receives at a junction point 56 the optimal velocity signals from generator 50 through a resistor 58, and the linear, continuous waveform #2 of FIG. 3L through a resistor 60. The subtractor subtracts the signal #2 of FIG. 3L, which represents the velocity of the head 10 at the various positions, from the optimal velocity signal produced by generator 50 to derive a velocity error signal $\epsilon_v(t)$ on line 62 representing the velocity that the head 10 should be increased or decreased to for optimal travel time purposes.

The velocity error signal $\epsilon_v(t)$ from subtractor 54 is then fed to a compensator 64 which functions to provide a signal having a phase lead to stabilize the servo system 18 to prevent oscillations of the head 10 when it arrives on the desired track 16. As will be shown in connection with FIG. 4, the compensator 64 provides a signal having a phase lead by taking the derivative $d\epsilon_v(t)/dt$ of the velocity error signal and summing it with the velocity error signal $\epsilon_v(t)$.

Figure 2:
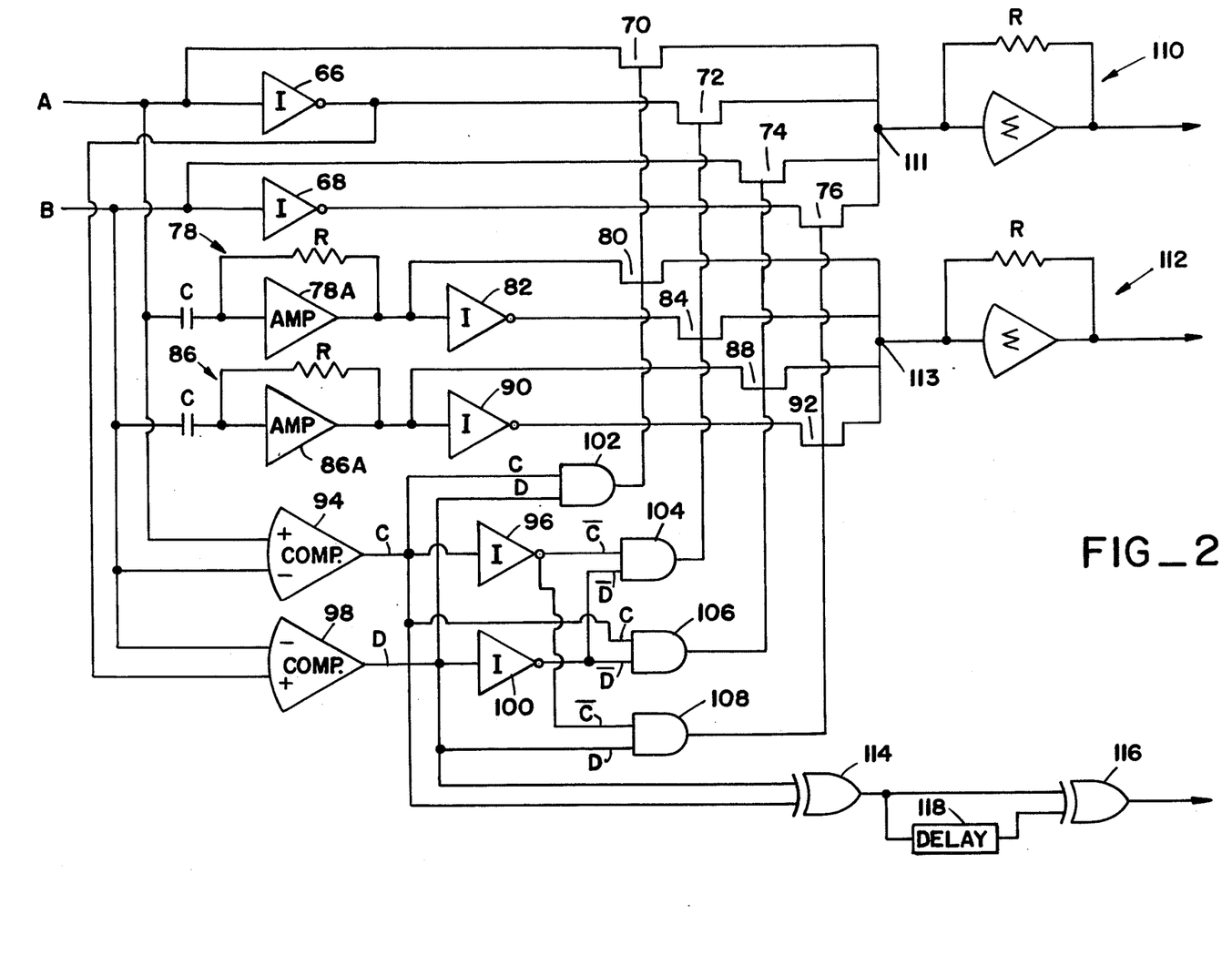
FIG. 2 is a schematic illustration of the commutating circuit shown in FIG. 1.

FIG. 2 illustrates in detail the commutating circuit 26. The circuit includes an inverter 66 receiving at its input the triangular waveform A from line 22, and an inverter 68 receiving at its input the triangular waveform B from line 24. The waveform A is fed to one field effect transistor (fet) 70 while the inverted waveform $\overline{A}$ (see FIG. 3A) from inverter 66 is fed to fet 72. The waveform B is fed to fet 74 and the inverted waveform $\overline{B}$ (see FIG. 3A) from inverter 68 is fed to fet 76.

Figure 3J:
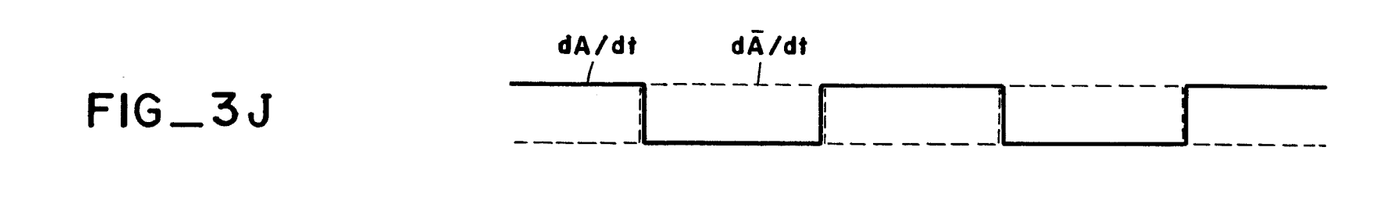
Figure 3K:
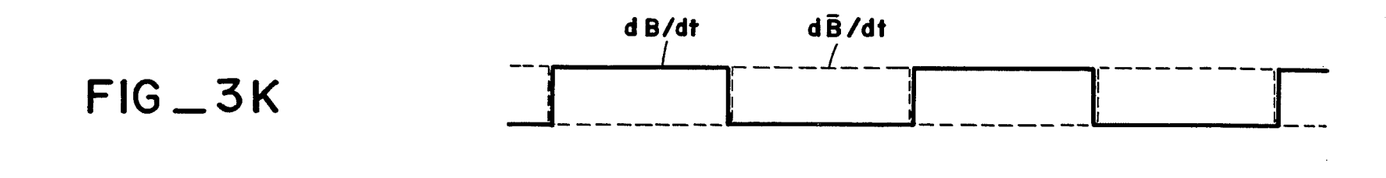
Figure 3L:
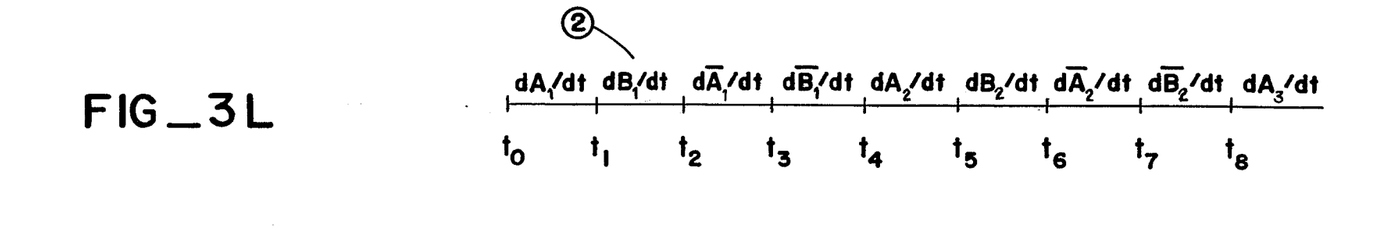

The waveform A is also fed to a differentiator generally shown by 78, including a capacitor C, resistor R and amplifier 78A. This differentiator 78 takes the derivative dA/dt of waveform A, shown in FIG. 3J, and feeds it to fet 80. An inverter 82 inverts the output of differentiator 78 to produce the inverted signal $d\overline{A}/dt$, shown in FIG. 3J, which is fed to fet 84. The waveform B is fed to a differentiator generally shown by 86 including a capacitor C, resistor R and amplifier 86A, which takes the derivative dB/dt of the waveform B, shown in FIG. 3K, and sends it to fet 88. An inverter 90 inverts the output of differentiator 86 to produce a signal $d\overline{B}/dt$, shown in FIG. 3K, which is fed to fet 92.

A comparator 94 compares the waveform A to the waveform B, which waveforms are fed to the respective inputs plus and minus of the comparator. When waveform A is greater than waveform B, comparator 94 produces an output signal C, shown in FIG. 3B. This output signal C is inverted by an inverter 96 to produce a signal $\overline{C}$ (not shown). Another comparator 98 compares the output of inverter 66, i.e., the signal $\overline{A}$ shown in FIG. 3A, to the waveform B, the signals being fed to the plus and minus inputs, respectively, of comparator 98. When $\overline{A}$ is greater than B, comparator 98 produces an output signal D shown in FIG. 3C. The output signal D is inverted by an inverter 100 to produce a signal $\overline{D}$ (not shown).

One AND gate 102 has two inputs receiving, respectively, signals C and D to produce an output shown in FIG. 3D for gating fets 70 and 80. A second AND gate 104 has two inputs receiving, respectively, the signals $\overline{C}$ and $\overline{D}$ to produce the output signals shown in FIG. 3F for gating fets 72 and 84. A third AND gate 106 has two inputs receiving, respectively, signal C and signal $\overline{D}$ to generate the output signal shown in FIG. 3E for gating fets 74,88. A fourth AND gate 108 has two inputs receiving, respectively, the signals $\overline{C}$ and D to produce the output signal shown in FIG. 3G for gating fets 76,92.

A summing network shown generally by 110 is connected in common at junction 111 to the outputs of fets 70,72,74 and 76. Summing network 110 combines these outputs to produce the sawtooth waveform #1 shown in FIG. 3H. Another summing network shown generally by 112 is connected in common at junction 113 to the outputs of fets 80,84,88 and 92. This network 112 combines these outputs to produce the waveform of FIG. 3L.

To generate the pulses counted by counter 34, the signals C and D from comparators 94,98 are fed as inputs to an exclusive-OR gate 114. Another exclusive-OR gate 116 receives as its two inputs the output from gate 114 and the output of a delay 118 which delays the output from 114 by 1 microsecond. The outputs of gate 116 are the pulses fed to counter 34, these outputs being generated each time there is a transition in signals C and D, as would be known by considering these transitions in relation to elements 114,116 and 118.

The operation of the commutating circuit 26 is as follows. With the waveforms A and B arriving at circuit 26 phase delayed as shown in FIG. 3A, the sequence of gating signals from gates 102,104,106 and 108 is as shown in FIGS. 3D–3G. First, AND gate 102 is enabled to close fet 70 for the duration of a pulse shown in FIG. 3D. The output of transistor 70 is, therefore, a linear signal portion $A_1$ of waveform A shown as one tooth of the sawtooth waveform of FIG. 3H. Simultaneously, transistor 80 is closed by AND gate 102 so that the derivative $dA_1/dt$ corresponding to the tooth $A_1$ shown in FIG. 3H is gated through transistor 80, as shown in FIG. 3L. Next, AND gate 106 is enabled to produce the gating pulses shown in FIG. 3E to close transistor 74. Consequently, the next input to the common junction point 111 is a linear signal portion $B_1$ of waveform B forming the next tooth of the sawtooth waveform shown in FIG. 3H. Also, transistor 88 is gated closed with the output of AND gate 106 so that the derivative $dB_1/dt$ corresponding to the tooth $B_1$ shown in FIG. 3H is next fed to the common junction 113. Then, AND gate 104 is enabled to produce the gating pulse as shown in FIG. 3F to close transistors 72 and 84. Consequently, the next signal fed to the common junction 111 is the linear portion $\overline{A}_1$ of the waveform $\overline{A}$ which forms the next tooth of the sawtooth waveform as shown in FIG. 3H. Also, the derivative $d\overline{A}_1/dt$ is gated through to junction 113 as shown in FIG. 3L. Finally, AND gate 108 is enabled to produce the gating signals shown in FIG. 3G which simultaneously close transistors 76 and 92. Accordingly, the next input to summer 110 is a linear portion $\overline{B}_1$ of the signal $\overline{B}$ forming the next tooth of the sawtooth waveform shown in FIG. 3H. Also, the derivative $d\overline{B}_1/dt$ corresponding to this tooth $\overline{B}_1$ is gated through to the common junction 113 to form the next part of the waveform shown in FIG. 3L. This process continues so that the sawtooth waveform shown in FIG. 3H is generated and has repetitive sections of teeth, each section comprising in order teeth $A_1,B_1,\overline{A}_1,\overline{B}_1$, teeth $A_2,B_2,\overline{A}_2,\overline{B}_2$, etc. Similarly, the waveform of FIG. 3L has repetitive sections, with each section having segments $dA_1/dt$; $dB_1/dt$, $d\overline{A}_1/dt$, and $d\overline{B}_1/dt$, segments $dA_2/dt$, $dB_2/dt$, $d\overline{A}_2/dt$, $d\overline{B}_2/dt$, etc.

As one example, if the amplitudes of waveforms A and B range from $-2$ volts to $+2$ volts, peak to peak, then the teeth of the sawtooth waveform shown in FIG. 3H will range from $-1$ volt to $+1$ volt.

As already noted, the linear, continuous positional error signal #4 shown in FIG. 3I is produced by the summation of the staircase waveform #3 and the sawtooth waveform of FIG. 3H. Each time counter 34 is decremented by 1, converter 40 generates a step S of the staircase waveform. This step is equal in amplitude to the transition from one tooth to the next tooth of the sawtooth waveform shown in FIG. 3H. Thus, in the example given above, since each tooth goes from $-1$ volt to $+1$ volt, the transition is 2 volts, which is equal to the amplitude of each step S as shown in FIG. 3I.

Furthermore, each step S is generated at the time of transition from one tooth to another tooth. Thus, assume at time $t_1$ shown below FIGS. 3H and 3L, there is a transition from tooth $A_1$ to tooth $B_1$. At this time a step $S_1$ of 2 volts is generated so that the staircase waveform #3 goes from $-8$ volts to $-6$ volts. At this time $t_1$, the waveform $B_1$ in FIG. 3H is $-1$ volt so that the sum of waveforms 1 and 3 is $-7$ volts, as shown in FIG. 3I. At midpoint between time $t_1$ and $t_2$ waveform $B_1$ has increased to 0 volts and at this midpoint, staircase waveform #3 is still $-6$ volts so that the sum of the two signals is $-6$ volts. Then, at time $t_2$ there is another transition from tooth $B_1$ to tooth $\overline{A}_1$ having a $-1$ volt; however, at this time of transition, another step $S_2$ of two volts is provided by converter 40 so that the staircase waveform #3 is now at $-4$ volts. Therefore, this $-4$ volts is added to the $-1$ volt of tooth $\overline{A}$ at time $t_2$ whereby the linear signal #4 equals $-5$ volts. As can now clearly be appreciated, by adding waveform #1 to the waveform #3 in the manner indicated above, a positional error signal #4, which is linear and continuous over the whole range of movement of head 10, is generated at the output of summer 42. It will also be noted that the velocity signal shown as waveform #2 in FIG. 3L also is linear and continuous over the full range of movement of the head 10.

FIG. 4 illustrates the compensator 64. Compensator 64 receives the velocity error signal $\epsilon_v(t)$ which is fed to an operator 120 having a transfer function $k_p$ and another operator 122, which is a differentiator having the transfer function $k_d d()/dt$. As shown, operator 120 includes resistors $R_1$ and $R_2$ and an amplifier 120A, while operator 122 includes a capacitor C, resistor $R_3$ and amplifier 122A. The output signal of operator 120, which is $k_p \times \epsilon_v(t)$ is fed as one input to a summing circuit shown generally by 124 through a resistor R. The output signal from operator 122, which is $k_d[d(\epsilon_v(t))/dt]$ is fed as the other input to the summing network 124 through another resistor R. Thus, compensator 64 takes the derivative of the velocity error signal from operator 122 and sums it with the velocity error signal from operator 120 to produce a signal which is in phase lead. The factors $k_p$ and $k_d$ are constants of proportionality chosen to stabilize the particular servo used for system 18 as would be well known.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for generating a first continuous, linear waveform from first and second triangular waveforms, the second triangular waveform being phase shifted in relation to the first triangular waveform, comprising:
   (a) means, responsive to said first and second triangular waveforms, for generating a sawtooth waveform, each tooth of said sawtooth waveform being of equal amplitude and the amplitude of each transition from one tooth to another tooth being equal;
   (b) means for generating a staircase waveform, each step of said staircase waveform being equal in amplitude to the transition from one said tooth to another said tooth, and the commencement of each said step being coincident with a said transition; and
   (c) means for summing said sawtooth waveform and said staircase waveform.

2. Apparatus according to claim 1 further comprising means, responsive to said first and second triangular waveforms, for generating a second continuous linear waveform corresponding to the slope of said sawtooth waveform.

3. Apparatus according to claim 2 wherein said staircase waveform generating means is responsive to said first and second triangular waveforms.

4. Apparatus according to claim 1 wherein said sawtooth waveform generating means comprises:
   (a) means for generating a first inverted waveform of said first triangular waveform;
   (b) means for generating a second inverted waveform of said second triangular waveform;
   (c) means for gating, in sequence, said first triangular waveform, said second triangular waveform, said first inverted waveform and said second inverted waveform so that each gated waveform corresponds to a tooth of said sawtooth waveform; and
   (d) means for combining said gated waveforms into said sawtooth waveform.

5. Apparatus according to claim 4 wherein said means for gating comprises:
   (a) a plurality of switches for gating therethrough a respective said waveform;
   (b) a plurality of AND gates, each having an output connected to a respective one of said switches, to close said switches;
   (c) a first comparator for producing a first signal when said first triangular waveform is greater than said second triangular waveform;
   (d) a first inverter for inverting said first signal;
   (e) a second comparator for producing a second signal when said first inverted waveform is greater than said second triangular waveform; and
   (f) a second inverter for inverting said second signal, and wherein said AND gates each have two inputs responsive, respectively, to said first signal and said second signal, to said first signal and said inverted second signal, to said inverted first signal and said inverted second signal, and to said inverted first signal and said second signal.

6. Apparatus according to claim 5 wherein said switches are field effect transistors.

7. Apparatus according to claim 2 wherein said means for generating said second continuous, linear waveform comprises:
   (a) first means for differentiating said first triangular waveform to produce a first signal;
   (b) first means for inverting said first signal;
   (c) second means for differentiating said second triangular waveform to produce a second signal;
   (d) second means for inverting said second signal;
   (e) means for gating, in sequence, said first signal, said second signal, said first inverted signal and said second inverted signal so that each gated signal corresponds to a respective tooth of said sawtooth waveform; and
   (f) means for combining said gated signals into said second continuous linear waveform.

8. Apparatus according to claim 7 wherein said means for gating comprises:
   (a) a plurality of switches for gating therethrough a respective said signal;
   (b) a plurality of AND gates, each having an output connected to a respective one of said switches, to close said switches;
   (c) a first comparator for producing a third signal when said first triangular waveform is greater than said second triangular waveform;
   (d) a first inverter for inverting said third signal;
   (e) means for inverting said first triangular waveform;
   (f) a second comparator for producing a fourth signal when said first inverted triangular waveform is greater than said second triangular waveform; and
   (g) a second inverter for inverting said fourth signal, and wherein said AND gates each have two inputs responsive, respectively, to said third signal and said fourth signal, to said third signal and said inverted fourth signal, to said inverted third signal and said inverted fourth signal, and to said inverted third signal and said fourth signal.

9. Apparatus according to claim 8 wherein said switches are field effect transistors.

10. Apparatus according to claim 3 wherein said staircase waveform generating means comprises:
    (a) means, receiving said first triangular waveform and said second triangular waveform, for generating counting pulses;
    (b) a counter for counting said pulses and producing a digital output signal each time a pulse is counted; and (c) a digital-to-analog converter for converting each said digital signal into one step of said staircase waveform.

11. Apparatus according to claim 10 wherein said means for generating counting pulses comprises:
   (a) means for inverting said first triangular waveform;
   (b) a first comparator for producing a first signal when said first triangular waveform is greater than said second triangular waveform;
   (c) a second comparator for producing a second signal when said first inverted waveform is greater than said second triangular waveform; and
   (d) gating means, responsive to said first signal and said second signal, to provide said gating pulses.

12. Apparatus according to claim 11 wherein said gating means comprises:
   (a) a first exclusive-OR gate receiving said first signal and said second signal to provide an output signal;
   (b) a delay means for delaying said output signal; and
   (c) a second exlusive-OR gate receiving said output signal from said first gate and said delayed output signal.

13. In a system in which one member is moved relative to another member, including a transducer for generating a first triangular waveform and a second triangular waveform representing the positions of said one member relative to said other member, said second waveform being phase shifted from said first waveform, apparatus for generating signals for controlling such relative movement, comprising:
   (a) first means, responsive to said first triangular waveform and said second triangular waveform, for generating a first continuous, linear signal representing the positions of said one member in relation to said other member over the range of movement of said one member; and
   (b) second means, responsive to said first triangular waveform and said second triangular waveform, for generating a second continuous, linear signal representing the velocity of said one member in relation to said other member at the relative positions of said one member over the range of movement of said one member.

14. Apparatus for generating signals according to claim 13, wherein said first means for generating comprises:
   (a) first means for inverting said first triangular waveform,
   (b) second means for inverting said second triangular waveform,
   (c) first means for gating, in a predetermined order, predetermined signal portions of said first triangular waveform, said first inverted waveform said second triangular waveform and said second inverted waveform; and
   (d) first means for combining said gated signal portions.

15. Apparatus for generating signals according to claim 14, wherein said second means for generating comprises:
   (a) first means for differentiating said first triangular waveform;
   (b) third means for inverting said differentiated first triangular waveform;
   (c) second means for differentiating said second triangular waveform;
   (d) fourth means for inverting said differentiated second triangular waveform;
   (e) second means for gating, in a predetermined order, predetermined signal portions of said differentiated first triangular waveform, said inverted differentiated first waveform, said differentiated second triangular waveform and said inverted differentiated second waveform; and
   (f) second means for combining said signal portions gated by said second gating means.

16. Apparatus for generating signals according to claim 15 wherein said first gating means comprises a first plurality of switches each gating respective signal portions and said second gating means comprises a second plurality of switches each gating respective signal portions.

17. Apparatus for generating signals according to claim 16 wherein said first gating means and said second gating means comprises a common means for generating pulses to close said first and said second plurality of switches, wherein each gating pulse closes simultaneously two said switches, respectively, of said first and said second plurality of switches.

18. Apparatus for generating signals according to claim 17 wherein said common means generates, in succession, a first gating pulse to gate said signal portions of said first triangular waveform and said differentiated first triangular waveform, a second gating pulse to gate said signal portions of said second triangular waveform and said differentiated second triangular waveform, a third gating pulse to gate said signal portions of said inverted first waveform and said inverted differentiated first waveform, and a fourth gating pulse to gate said signal portions of said inverted second triangular waveform and said inverted differentiated second waveform.

19. A system for moving a member, comprising:
   (a) first means for generating first and second signals corresponding to the positions of said member over the range of movement of said member, said second signals having the same waveform as said first signals and being phase displaced from said first signals;
   (b) second means, responsive to said first and said second signals, for generating a continuous, linear third signal over the full range of movement of said moving member, said third signal representing the positions of said moving member (;), said second generating means comprising first means for developing a fifth signal of a predetermined waveform each time said moving member is at specified positions along its path of movement, second means for developing a sixth signal of a predetermined waveform different from said fifth signal, and means for adding said fifth signal and said sixth signal to produce said third signal, said sixth signal being a sawtooth waveform and said fifth signal being a staircase waveform in which each step of said staircase waveform is equal in amplitude to the transition from one tooth to another tooth of said sawtooth waveform, the commencement of each said step being coincident with said transition;
   (c) third means, responsive to said first and second signals, for generating a continuous, linear fourth signal over the full range of movement of said moving member, said fourth signal representing the velocity of said moving member; and
   (d) means for controlling the movement of said moving member in accordance with said third and said fourth signals.

20. A system according to claim 19 wherein said controlling means comprises:
   (a) fourth means, responsive to said third signal and said fourth signal, for generating an error signal representing the velocity said moving member should have when said member is at a specified position; and
   (b) means, responsive to said error signal, for changing the velocity of said member.

21. A system according to claim 22 wherein said changing means comprises:
   (a) a movable support means connected to said member; and
   (b) phase compensating means to phase lead said error signal, said support means being moved in response to said phase lead error signal to move said member to prevent oscillations thereof.

22. A system according to claim 21 wherein said phase compensating means comprises:
   (a) means for differentiating said error signal; and
   (b) means for summing said error signal and said differentiated error signal.

23. A system according to claim 22 wherein said fourth generating means comprises:
   (a) a function generator, responsive to said third signal, for generating optimal velocity signals for each position of said moving member; and
   (b) means for subtracting said optimal velocity signals from said fourth signal.

24. A system according to claim 23 wherein said movable support means is defined by third order differential equations.

* * * * *